UNITED STATES PATENT OFFICE.

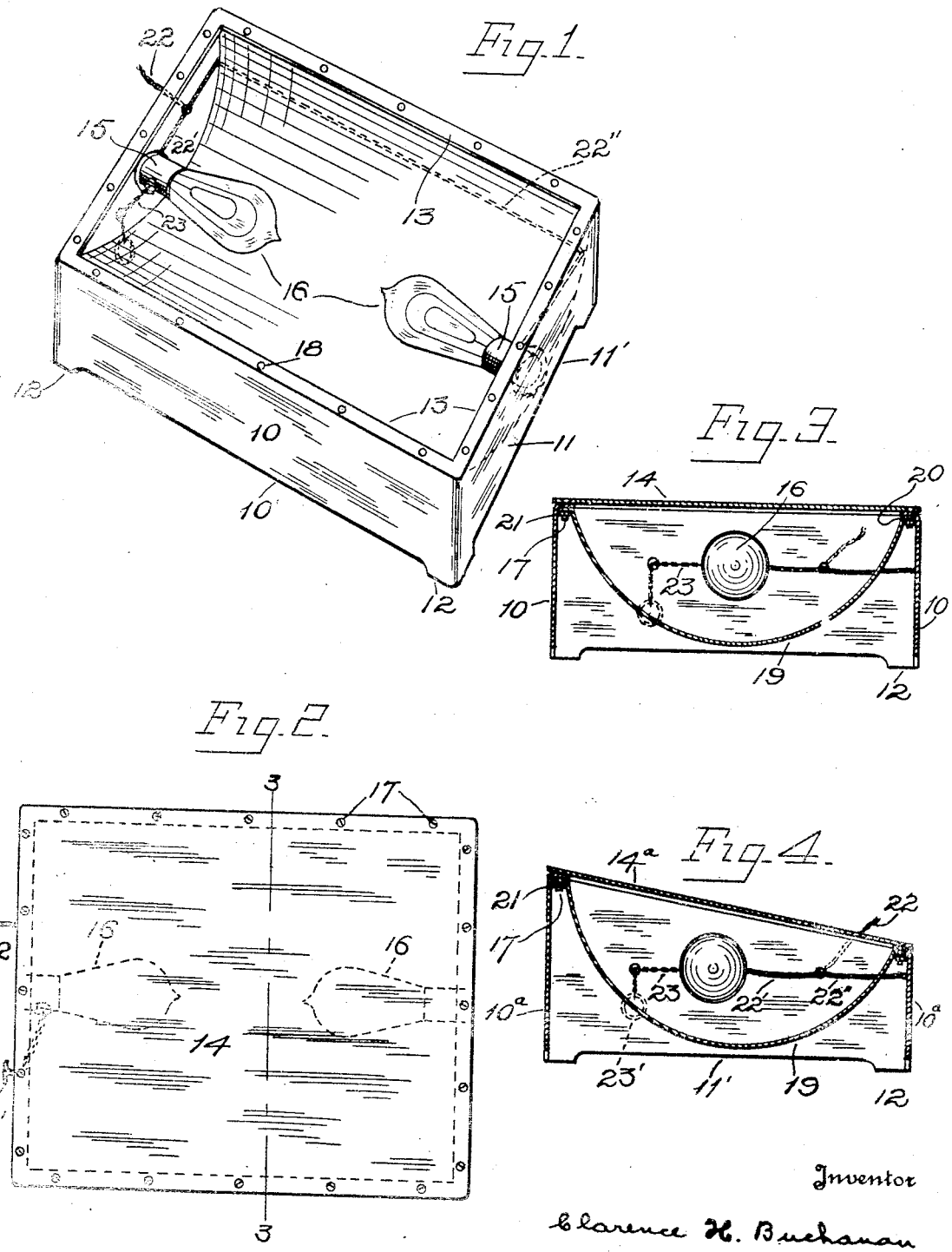

CLARENCE H. BUCHANAN, OF WASHINGTON, DISTRICT OF COLUMBIA.

FOOT-WARMER.

1,307,615.　　　　　Specification of Letters Patent.　　Patented June 24, 1919.

Application filed August 21, 1918. Serial No. 250,808.

*To all whom it may concern:*

Be it known that I, CLARENCE H. BUCHANAN, of Washington, in the District of Columbia, have invented certain new and useful Improvements in Foot-Warmers, of which the following is a full, clear, and exact description.

This invention relates to an electric warmer, and more particularly to an electric foot warmer which is so constructed that substantially the entire amount of electric energy consumed in the warmer is utilized to heat the foot warming plate.

Heretofore one method of constructing an electric foot warmer consisted in providing a box or receptacle having electric lamps, or the like, therein with a lid having an open construction to permit the heated air to come in contact with the feet placed upon the lid. Such a foot warmer is disclosed in the patent to Ulmer, No. 492,247, February 21, 1893. The only function performed by the lid disclosed in this patent is to support the feet above the electric lamps.

I have found that the amount of electric energy required to furnish the desired amount of heat may be greatly reduced by constructing the electric foot warmer in the manner hereinafter set forth so that the air heated by the electric lamps, or the like, is not used directly to warm the feet, but conveys substantially the entire amount of heat given off by the electric lamps to a non-perforated lid or cover with which I provide my device. The non-perforated lid or cover in this manner is kept warm by using a very small amount of electric energy, and the feet or other objects to be warmed may be placed upon the lid of my foot warmer in an obvious manner.

The principal object of my invention is to provide an electric heating receptacle which is so constructed that substantially the entire amount of heat produced by the electric heating elements, is directed against a heat absorbing cover, the cover being constructed to prevent the hot air produced in the receptacle from escaping therethrough and thereby reduces the amount of energy required to heat the feet or other objects placed upon the cover of the heating receptacle.

Another object of my invention is to improve the general construction and arrangement of parts in the type of foot warmer to which my invention relates.

To these and other ends, the invention consists in the novel features and combinations of parts to be hereinafter described and claimed.

In the accompanying drawing,

Figure 1 is a perspective view of my foot warmer, the lid or cover of the same being removed;

Fig. 2 is a plan view of my foot warmer complete;

Fig. 3 is a sectional view taken on the line 3—3 of Fig. 2; and

Fig. 4 is a sectional view of a modification of the device shown in Figs. 1, 2 and 3.

The embodiment of my invention illustrated in the drawing consists of a box-like receptacle constructed preferably of sheet metal having the side walls 10 and the end walls 11 formed preferably of one continuous strip of metal, the side and end walls being preferably cut away adjacent their lower edge, as shown at 10′, 11′, to form the feet 12 at each corner of the receptacle. The upper edge of the side walls 10 and end walls 11 are bent inwardly in a substantially horizontal direction, as at 13, to form an inwardly directed horizontal ledge upon which the lid or cover 14 rests. At each end of my receptacle upon the inner face thereof is mounted a lamp socket 15 of any well-known construction, the same being secured to the inner face of the end walls 11 in any desired manner. In each of the lamp sockets 15 is mounted any preferred form of electric lamp, such as 16. The cover 14 above mentioned is preferably formed of sheet metal and is secured in place upon my receptacle by a plurality of screws 17, the heads of the same being preferably countersunk in the upper face of the cover 14 in order that they may lie flush with the upper face of this cover. These screws pass through drill holes 18 formed in the inwardly directed ledges 13. In order to provide means for reflecting the heat produced by the electric lamps 16 upwardly against the inner face of the cover 14, I provide a reflector 19 which is curved transversely in the arc of a circle, as shown in Fig. 3. This reflector is of substantially the same length as the interior of my receptacle in order that the ends of this reflector will fit snugly against the inner face of the end walls 11. The lateral edges of the reflector 19 are bent outwardly at an angle to the curved portion of the reflector, as at 20. These outwardly flared portions 20 lie directly under the inwardly directed ledges 13 and form a convenient means for securing the reflector 19 in place within the receptacle. The screws 17 which pass through the cover 14 and through the drill holes 18 pass also through the portions 20 of the reflector and are secured thereto by the nuts 21 threaded upon the inner end of the screws 17. The inner concave surface of the reflector 19 is preferably highly polished in order to reflect the heat upwardly against the inner surface of the cover 14.

From the construction so far described it will be seen that substantially the entire amount of heat produced by the electric lamps 16 is reflected upwardly against the inner face of the cover 14, which is preferably constructed of dull sheet metal in order that it will readily absorb the heat rays directed against the same. It will also be seen that the construction of my foot warming receptacle is such that the hot air produced inside of the same by the lamps 16 is prevented to a more or less extent from escaping therefrom, since my device is so constructed that the air within the receptacle is confined therein between the cover 14, the reflector 19, and the end walls 11.

The cover 14 and the walls of my receptacle should be sufficiently strong to permit a heavy person to stand on the cover without injuring my device. The lamp sockets 15 are preferably supplied with current by means of a flexible insulated wire 22, which passes through one of the end walls 11, one branch of this wire 22' leading to one lamp socket, and the other branch 22" leading to the other lamp socket. Under some circumstances, it may be desirable to use only one of the electric lamps 16 to heat the cover 14. I therefore provide one of the lamp sockets 15 with a well-known type of switch, not shown, which may be operated to turn the lamp "off" or "on" by pulling the chain 23, which extends from the lamp socket through an opening in one of the end walls 11 and has a ring, or the like, 23', upon its outer end by which the chain may be operated. In order to reduce to a minimum the amount of heat which is permitted to escape from the end walls 11, the inner surfaces of these walls are preferably polished so that the heat given off by the electric lamps will be reflected inwardly from these walls and upwardly by the polished reflector 19.

In Fig. 4 of the drawing, I have shown a modification of my electric foot warmer. This device, however, is quite similar to the construction shown in Figs. 1, 2 and 3, except the cover 14ª does not lie in a horizontal plane but lies at an angle thereto. This construction is produced by making one of the side walls 10ª higher than the opposite side wall, as shown. The device shown in Figs. 1, 2 and 3, is designed more particularly to be used by a person standing, who desires to rest either one or both feet on the lid or cover 14 in order to warm his feet, whereas the device disclosed in Fig. 4 is designed so that a person may conveniently rest his feet upon the cover 14ª while sitting down. The current used in my electrical heating device may be supplied from any commercial electric circuit, from a storage battery, or if desired from a dry battery, since the heat produced by my device is utilized so efficiently that a very small amount of current is required to heat the cover sufficiently to warm the feet. Should it become necessary to renew one or both of the lamps 16, this may be readily done by removing a sufficient number of the screws 17 to permit the cover 14 to be raised a sufficient distance to permit the hand to be inserted within the receptacle in order to unscrew the electric lamp from its socket.

The electric heater herein described may be used in the home, in a commercial building, in an automobile, or wherever else desired, and since the same may be operated either with a storage or dry battery, it is not necessary that the building in which the same is used be electrically wired. Furthermore, although I have described the electric lamps 16 as the means provided for producing the required heat, it will be apparent that any desired electrical heating elements may be used in place of the lamps herein disclosed.

Although I have shown what I consider the most desirable manner of constructing my heater, it is evident that changes and modifications therein may be made without departing from the scope of my invention as defined in the annexed claims.

What I claim is:

1. An electric heater, comprising a boxlike receptacle having side and end walls, inwardly directed ledges formed at the upper edge of said walls, a heat absorbing cover secured upon said ledges, electric heating elements mounted in said receptacle, and an elongated transversely curved reflector mounted in said receptacle below said heating elements for reflecting the heat against said cover, said reflector having outwardly flared flanges secured to said ledges.

2. An electric heater, comprising a boxlike receptacle having side and end walls, a heat absorbing cover for said receptacle, electric heating elements mounted in said receptacle, an elongated transversely curved reflector for reflecting the heat against said cover, coöperating flanges upon said reflector and walls, and means extending through said cover and said flanges for securing the same together.

3. An electric heater, comprising a box-like receptacle having side and end walls, inwardly directed ledges formed at the upper edge of said walls, a cover mounted upon said ledges, an electric heating element in said receptacle, and an elongated transversely curved reflector mounted in said receptacle below said heating element for reflecting the heat upward, said reflector having outwardly flared flanges secured to said ledges.

In witness whereof, I have hereunto set my hand on the 17th day of August, 1918.

CLARENCE H. BUCHANAN.